United States Patent
Fan

(10) Patent No.: US 12,055,972 B2
(45) Date of Patent: Aug. 6, 2024

(54) CONTROL METHOD, APPARATUS, ELECTRONIC DEVICES, AND STORAGE MEDIUM

(71) Applicant: Lenovo (Beijing) Limited, Beijing (CN)

(72) Inventor: Haitao Fan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/994,203

(22) Filed: Nov. 25, 2022

(65) Prior Publication Data
US 2023/0213969 A1    Jul. 6, 2023

(30) Foreign Application Priority Data
Dec. 31, 2021    (CN) .......................... 202111679173.7

(51) Int. Cl.
G06F 1/16      (2006.01)
G06F 3/01      (2006.01)
H04M 1/72415   (2021.01)

(52) U.S. Cl.
CPC .............. *G06F 1/163* (2013.01); *G06F 3/011* (2013.01); *H04M 1/72415* (2021.01)

(58) Field of Classification Search
CPC ...... G06F 1/1616; G06F 1/163; G06F 1/1684; G06F 1/1688; G06F 3/011; G06F 3/012; H04M 1/72415
See application file for complete search history.

(56) References Cited

U.S. PATENT DOCUMENTS

| | | | |
|---|---|---|---|
| 2013/0041648 A1* | 2/2013 | Osman ................... | H04S 7/302 381/300 |
| 2016/0071409 A1* | 3/2016 | Suomela .............. | H04R 1/1041 340/12.5 |
| 2020/0092641 A1* | 3/2020 | Smus ...................... | G06F 3/012 |
| 2023/0246671 A1* | 8/2023 | Carrigan ............. | H04L 65/1094 320/108 |

* cited by examiner

*Primary Examiner* — Nelson M Rosario
(74) *Attorney, Agent, or Firm* — ANOVA LAW GROUP, PLLC

(57) ABSTRACT

A control method includes obtaining a first feedback signal from a wearable device in response to a first electronic device, and a first feedback signal from at least one second electronic device in response to the first electronic device; identifying a target electronic device from the first electronic device and the at least one second electronic device, according to at least one first feedback signal based on the first feedback signal from the wearable device and the first feedback signal from the at least one second electronic device; and obtaining and transmitting first information to the target electronic device for the target electronic device to execute the first information. A relative angle between the target electronic device and the wearable electronic device is within a set angle range, and the first information is at least relevant to an output function of the target electronic device.

20 Claims, 10 Drawing Sheets

CONTROL METHOD, APPARATUS, ELECTRONIC DEVICES, AND STORAGE MEDIUM

CROSS-REFERENCE TO RELATED APPLICATION

The present application claims priority to Chinese Patent Application No. 202111679173.7, filed Dec. 31, 2021, the entire content of which is incorporated herein by reference.

TECHNICAL FIELD

The present application relates to the field of display technology and, in particular, to a control method, apparatus, electronic device, and non-transitory computer readable storage medium.

BACKGROUND

In using electronic devices, a single display is not enough to meet display needs. Extended displays may thus be used to provide more display capabilities.

Information related to an output function of the display is provided to the extended displays by the electronic device. Specifically, the user manually selects one of the extended displays on the electronic device. The electronic device then transmits the information to the one of the extended displays. Such process is complicated with poor user experience.

SUMMARY

In accordance with the disclosure, there is provided a control method applied to a first electronic device. The control method includes obtaining a first feedback signal from a wearable device of a user in response to the first electronic device, and a first feedback signal from at least one second electronic device in response to the first electronic device; identifying a target electronic device of the user from the first electronic device and the at least one second electronic device, according to at least one first feedback signal based on the first feedback signal from the wearable device and the first feedback signal from the at least one second electronic device; and obtaining first information and transmitting the first information to the target electronic device for the target electronic devices to execute the first information. A relative angle between the target electronic device and the wearable device is within a set angle range. The first information is at least relevant to an output function of the target electronic device.

Also in accordance with the disclosure, there is provided an electronic device. The electronic device includes: a memory, configured to store at least one set of instructions; and a processor, configured to call and execute the at least one set of instructions in the memory, and to perform a control method. The control method includes obtaining a first feedback signal from a wearable device of a user in response to the first electronic device, and a first feedback signal from at least one second electronic device in response to the first electronic device; identifying a target electronic device of the user from the first electronic device and the at least one second electronic device, according to at least one first feedback signal based on the first feedback signal from the wearable device and the first feedback signal from the at least one second electronic device; and obtaining first information and transmitting the first information to the target electronic device for the target electronic devices to execute the first information. A relative angle between the target electronic device and the wearable device is within a set angle range. The first information is at least relevant to an output function of the target electronic device.

Also in accordance with the disclosure, there is provided a non-transitory computer readable storage medium, configured to store a computer program. The computer program, when being executed, causes a processor to implement a control method. The control method includes obtaining a first feedback signal from a wearable device of a user in response to the first electronic device, and a first feedback signal from at least one second electronic device in response to the first electronic device; identifying a target electronic device of the user from the first electronic device and the at least one second electronic device, according to at least one first feedback signal based on the first feedback signal from the wearable device and the first feedback signal from the at least one second electronic device; and obtaining first information and transmitting the first information to the target electronic device for the target electronic devices to execute the first information. A relative angle between the target electronic device and the wearable device is within a set angle range. The first information is at least relevant to an output function of the target electronic device.

As disclosed, the first electronic device obtains a first feedback signal from a wearable device of a user in response to a first electronic device and a first feedback signal from at least one second electronic device in response to the first electronic device. The first electronic device identifies a target electronic device of the user from the first electronic device and the at least one second electronic device, according to at least one first feedback signal based on the first feedback signal from the wearable device and the first feedback signal from the at least one second electronic device. The first electronic device obtains and transmits the first information to the target electronic device, which simplifies operation procedures and enhances user experience.

BRIEF DESCRIPTION OF THE DRAWINGS

The following drawings are incorporated herein as a part of the present disclosure. The accompanying drawings illustrate certain embodiment(s) of the present disclosure, which explains the principles of the present disclosure.

DETAILED DESCRIPTION OF THE EMBODIMENTS

Technical solutions of the present disclosure will be described with reference to the accompanying drawings and specific embodiments. It will be appreciated that the described embodiments are some rather than all of the embodiments of the present disclosure. Other embodiments conceived by those having ordinary skills in the art on the basis of the described embodiments without inventive efforts should be encompassed within the scope of the present disclosure.

Figure 1:
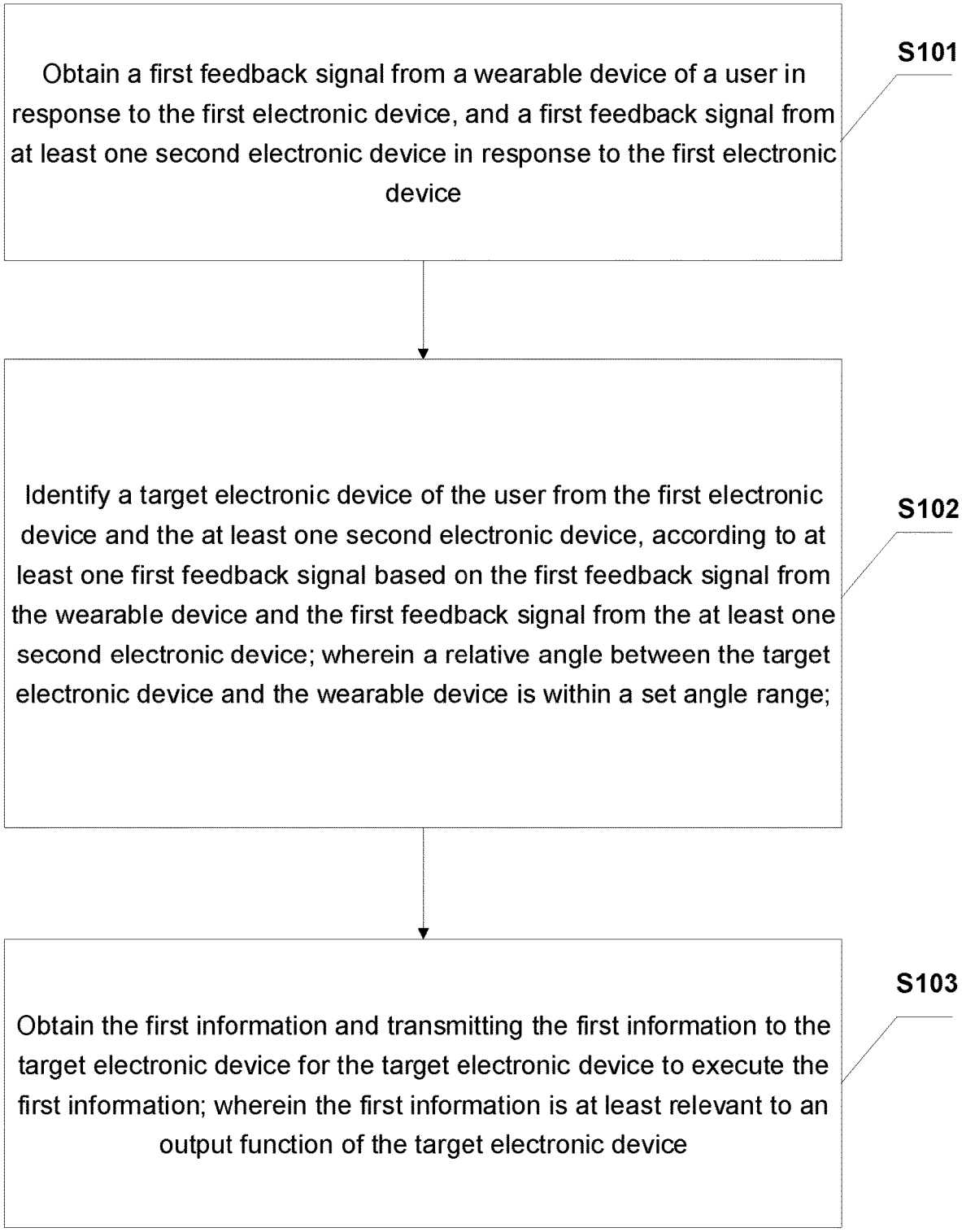
FIG. 1 depicts a schematic flowchart of an exemplary control method according to various embodiments of the present disclosure.

FIG. 1 depicts a schematic flowchart of an exemplary control method according to various embodiments of the present disclosure. The exemplary control method can be applied to a first electronic device, although any product type of electronic device can be applied without limitation. As shown in FIG. 1, the method includes the following steps:

S101: obtaining a first feedback signal from a wearable device of a user in response to the first electronic device, and a first feedback signal from at least one second electronic device in response to the first electronic device.

The first electronic device transmits a signal when the first electronic device confirms the delivery of the signal, including but not limited to obtaining a power-on signal of the first electronic device or confirming the first electronic device is in an extension mode. The extension mode can include, for example, a mode in which the display range of the first electronic device is extended. In the extension mode, the first electronic device displays the same or different information between a display unit of the first electronic device and at least one extended display unit, respectively.

A transmission signal of the first electronic device includes but is not limited to an ultrasonic signal or an electromagnetic signal from the first electronic device.

After receiving the transmission signal from the first electronic device, the wearable device or at least one second electronic device can respond to those signals by transmitting first feedback signals to the first electronic device. Correspondingly, the first electronic device can obtain a first feedback signal from the wearable device in response to the first electronic device and a first feedback signal from at least one second electronic device in response to the first electronic device.

In one embodiment, the first electronic device transmits a signal through a first output unit. The first electronic device obtains the first feedback signal from the wearable device in response to the first electronic device and the first feedback signal from at least one second electronic device in response to the first electronic device through a first input device.

Correspondingly, the wearable device or a second electronic device obtains the transmission signal from the first electronic device by a second input unit and transmits the first feedback signal through a second output unit.

In some embodiments, the first output unit and the first input unit have the same type of function. For example, the first output unit is an audio output unit, and the first input device is an audio input unit; or the first output unit is an image output unit, and the first input unit is an image input unit.

In some embodiments, the first output unit and the first input unit have different types of functions. For example, the first output unit is an audio output unit, but the first input unit is an image input unit; Another example is that the first output unit is an image output unit, but the first input unit is an audio input unit.

In some embodiments, the second output unit and the second input unit have the same type of function. In some embodiments, the second output unit and the second input unit have different types of functions. For example, the second output unit is an audio output unit, and the second input unit is also an audio input unit; or, the second output unit is an image output unit, and the second input unit is also an image input unit; or, the second output unit is an audio output unit, but the second input unit is an image input unit; or, the second output unit is an image output unit, but the second input unit is an audio input unit.

S102: identifying a target electronic device of the user from the first electronic device and the at least one second electronic device, according to at least one first feedback signal based on the first feedback signal from the wearable device and the first feedback signal from the at least one second electronic device, a relative angle between the target electronic device and the wearable device being in a set angle range.

For example, identifying the target electronic device of the user from the first electronic device and the at least one second electronic device, according to at least one first feedback signal based on the first feedback signal from the wearable device and the first feedback signal from the at least one second electronic device includes but is not limited to:

S1021: identifying at least one electronic device from the first electronic device and the at least one second electronic device, according to at least one first feedback signal based on the first feedback signal from the wearable device and the first feedback signal from the at least one second electronic device, a relative angle between the at least one electronic device and the wearable device being determined.

S1022: based on the relative angle between at least one electronic device and the wearable device, identifying an electronic device in which a relative angle between the electronic device and the wearable device is in the set angle range as the target electronic device.

In some embodiments, the target electronic device may include a target electronic device that the user demands to use. For example, an electronic device currently being used by the user is the first electronic device. From the first electronic device and the at least one second electronic device, identifying a second electronic device that a relative angle between that second electronic device and the wearable device is in the set angle range as the target electronic device.

In some embodiments, the target electronic device may include a target electronic device currently being used by the user. For example, an electronic device currently being used by the user is the first electronic device. From the first electronic device and the at least one second electronic device, confirming that a relative angle between the first electronic device and the wearable device is in the set angle range. The first electronic device is identified as the target electronic device.

S103: obtaining first information and transmitting first information to the target electronic device for the target electronic device to execute first information. In some embodiments, first information is relevant to the output function of the target electronic device.

In some embodiments, the first information includes a first parameter, a second parameter, and the display data displayed by the first electronic device, as individual elements or any combinations. The first parameter is related to a display function of the target electronic device. The second parameter is related to audio input and output functions of the target electronic device.

For an implementation manner that first information is the display data displayed by the first electronic device, obtaining first information and transmitting first information to the target electronic device includes but is not limited to:

S1031: in response to a first trigger event, obtaining a display data displayed by the first electronic device and transmitting the display data displayed by the first electronic device to the target electronic device.

In some embodiments, in response to the first trigger event, including: in response to a first input order, the first input order is used to instruct the first electronic device to transmit the display data displayed by the first electronic device to the target electronic device; or in response to a request for display data transmitted by the target electronic device, first input information including an input order of gesture; or a transmitting order obtained from an input interface of the first electronic device.

In one embodiment, the first electronic device obtains a first feedback signal from a wearable device of a user in response to a first electronic device and a first feedback signal from at least one second electronic device in response to the first electronic device. The first electronic device identifies a target electronic device of the user from the first electronic device and the at least one second electronic device, according to at least one first feedback signal based on the first feedback signal from the wearable device and the first feedback signal from the at least one second electronic device. The first electronic device obtains and transmits the first information to the target electronic device, which simplifies operation procedures and enhances user experience.

In addition, the first electronic device, the wearable device, and the second electronic device can obtain signals through their own input units and transmit signals through their own output units. The disclosed method allows reduced hardware cost by avoiding the hardware upgrade of the first electronic device, the wearable device, or the second electronic device.

Figure 2:
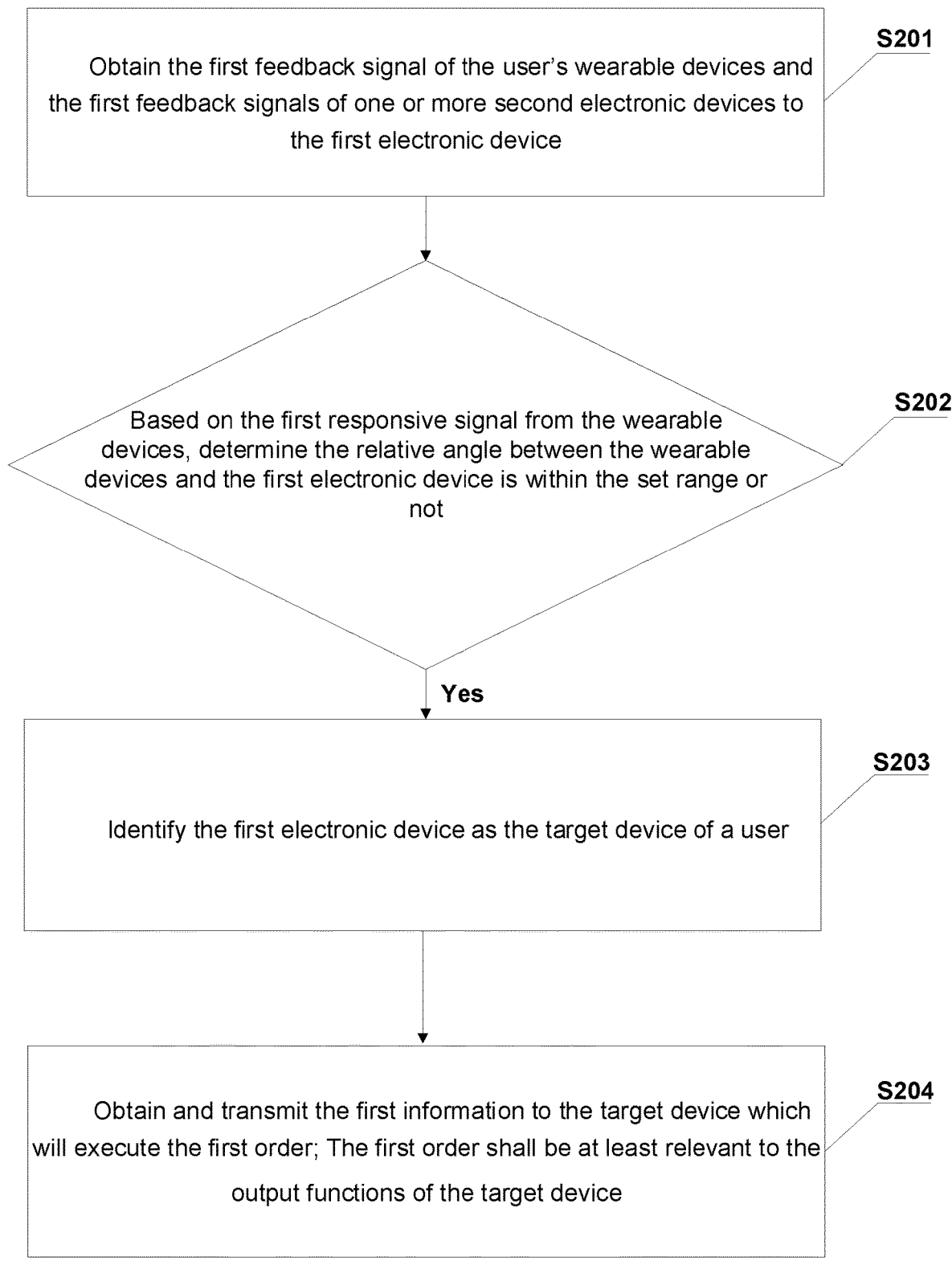
FIG. 2 depicts a schematic flowchart of another exemplary control method according to various embodiments of the present disclosure.

FIG. 2 illustrates a schematic flowchart of another exemplary control method according to various embodiments of the present disclosure. As shown in FIG. 2, the control method includes but is not limited to the following steps:

S201: obtaining a first feedback signal from a wearable device of a user in response to the first electronic device, and a first feedback signal from at least one second electronic device in response to the first electronic device.

In various embodiments, S201 may be processed in a same or similar manner as illustrated in S101 of FIG. 1.

S202: based on a first feedback signal of the wearable device, determining whether the relative angle between the wearable device and the first electronic device is in the set angle range.

Based on the first feedback signal of the wearable device, determination of whether the relative angle between the wearable device and the first electronic device is in the set angle range includes but is not limited to:

S2021: determining a relative distance between the wearable device and the first electronic device based on the first feedback signal of the wearable device.

In some embodiments, the determination of a relative distance between the wearable device and the first electronic device based on the first feedback signal of the wearable device may include calculating a transmission time of a signal transmitted by the first electronic device between the first electronic device and the wearable electronic based on the first feedback signal of the wearable device. A product of the transmission time and a propagation speed of the signal transmitted by the first electronic device is the relative distance between the wearable device and the first electronic device.

S2022: based on the relative distance between the wearable device and the first electronic device, determining the relative angle between the first electronic device and the wearable device.

Figure 3:
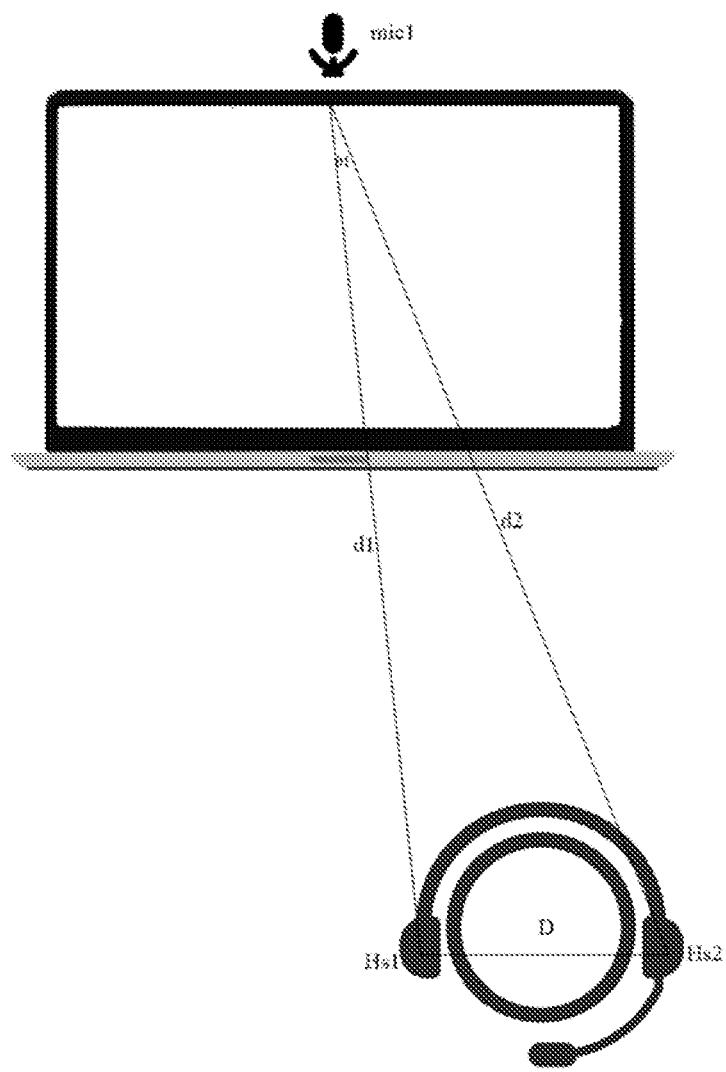
FIG. 3 schematically depicts relative angle between a first electronic device a wearable device according to various embodiments of the present disclosure.

In an example embodiment, the wearable device is a headset. The first electronic device transmits a signal through the first output device. As shown in FIG. 3, The first output unit of the first electronic device is denoted as mic1, and two second output units of the headset are denoted as Hs1 and Hs2, respectively. d1 denotes the distance between mic1 and Hs1. d2 denotes the distance between mic1 and Hs2. d denotes the distance between Hs1 and Hs2. Based on d1, d2, and d, θ1 can be determined.

It should be noted that the relative angle shown in FIG. 3 is only an example, which is not intended to limit the angle between the first electronic device and the wearable device.

S2023: determining whether the relative angle between the wearable device and the first electronic device is in the set angle range.

When the relative angle is in the set angle range, S203 is processed.

S203: identifying the first electronic device as the target electronic device.

S202-S203 are exemplary processes of processing S102 illustrated in FIG. 1.

S204: obtaining the first information and transmitting the first information to the target electronic device for the target electronic device to execute the first information, the first information BEING at least relevant to the output function of the target electronic device.

In various embodiments, S204 may be processed in a same or similar manner as illustrated in S103 of FIG. 1.

In one embodiment, the first electronic device identifies the target electronic device from the first electronic device and the at least one second electronic device based on the first feedback signal of the wearable device. The first electronic device determines whether the relative angle between the wearable device and the first electronic device is in the set angle range. In response to the relative angle being in the set angle range, the first electronic device confirms the first electronic device is currently being used by the user, by which the target electronic device is confirmed and an obtained first information is transmitted to the target electronic device. One embodiment simplifies the operation process and improves the user experience.

Figure 4:
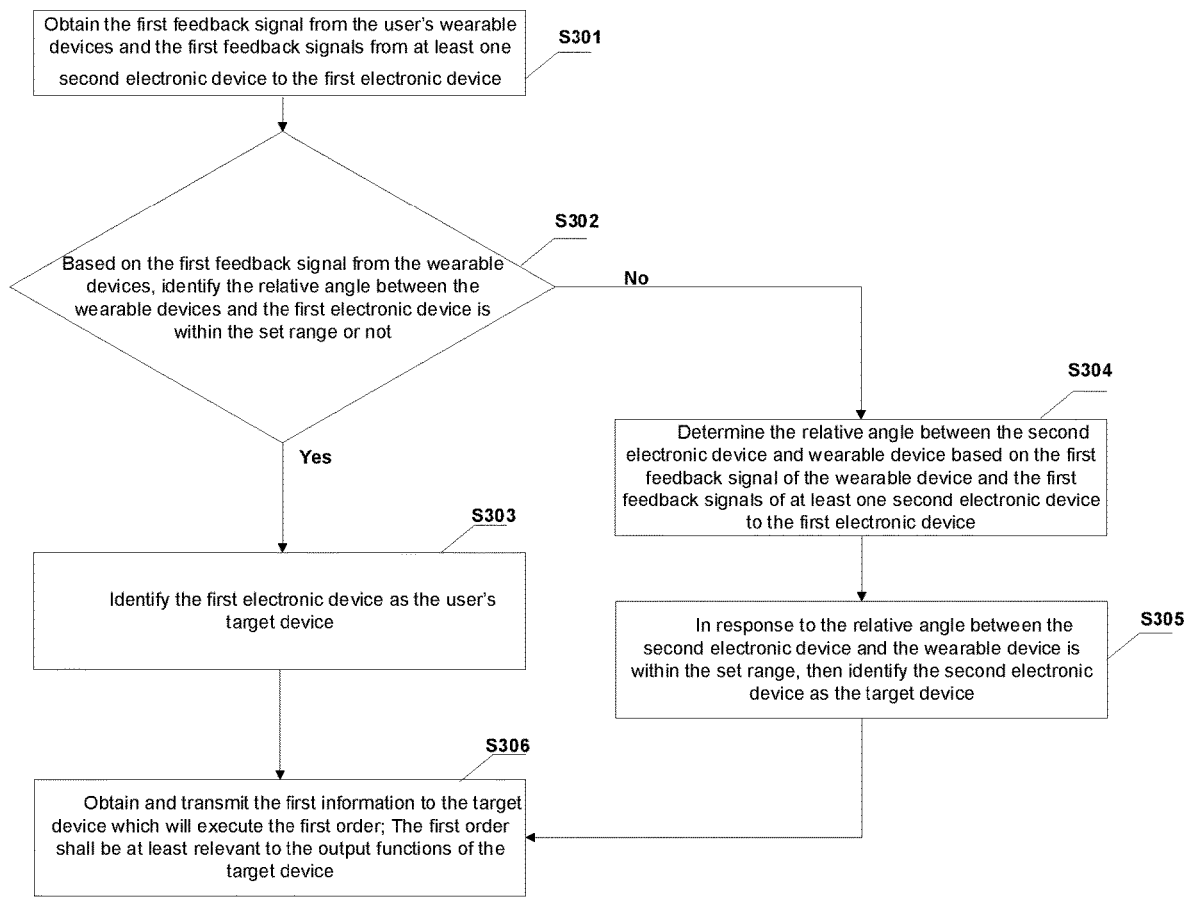
FIG. 4 depicts a schematic flowchart of another exemplary control method according to various embodiments of the present disclosure.

FIG. 4 depicts a schematic flowchart of another exemplary control method according to various embodiments of the present disclosure. For example, FIG. 4 further extends the control method described in FIG. 2. As shown in FIG. 4, the control method can include but is not limited to the following steps:

S301: obtaining a first feedback signal from a wearable device of a user in response to the first electronic device, and a first feedback signal from at least one second electronic device in response to the first electronic device.

S302: based on the first feedback signal of the wearable device, determining whether a relative angle between the wearable device and the first electronic device is in the set angle range.

In response to the relative angle between the wearable device and the first electronic device being in the set angle range, S303 is processed; Otherwise, S304 is processed.

S303: identifying the first electronic device as the target electronic device.

In various embodiments, S301-S303 may be processed in a same or similar manner as illustrated in S201-S203 of FIG. 2.

S304: determining a relative angle between the second electronic device and the wearable device based on the first feedback signal from the wearable device and the first feedback signal from the at least one second electronic device.

In one embodiment, the determination of the relative angle between the second electronic device and the wearable device based on the first feedback signal from the wearable device and the first feedback signal from the at least one second electronic device includes:

S3041: determining the relative angle between the wearable device and the first electronic device based on the first feedback signal of the wearable device. In various embodiments, S3041 may be processed in a same or similar manner as illustrated in S2021-S2022 of FIG. 2.

S3042: determining the relative angle between the second electronic device and the first electronic device based on the first feedback signal of the second electronic device, which may include:

S30421: determining the relative distance between the second electronic device and the first electronic device based on the first feedback signal of the second electronic device. The determination of the relative distance between the first electronic device and the second electronic device is based on the first feedback signal of the second electronic device, for example, by calculating a transmission time of the signal transmitted by the first electronic device between the first electronic device and the second electronic device based on the first feedback signal of the second electronic device. The product of the transmission time and the propagation speed of the signal emitted by the first electronic device is the relative distance between the first electronic device and the second electronic device.

S30422: determining the relative angle between the second electronic device and the first electronic device based on the relative distance between the second electronic device and the first electronic device.

S3043: determining the relative angle between the wearable device and the second electronic device based on two factors. The first factor is the relative distance and relative angle between the wearable device and the first electronic device. The second factor is the relative distance and relative angle between the second electronic device and the first electronic device.

S305: in response to the relative angle between the second electronic device and the wearable device being in the set angle range, identifying the second electronic device as the target electronic device.

S306: obtaining and transmitting the first information to the target electronic device, by which the target electronic device performs an operation based on the first information. The first information is at least relevant to the output function of the target electronic device.

In one embodiment, based on the first feedback signal of the wearable device, the first electronic device identifies the target electronic device from the first electronic device and the at least one second electronic device. The first electronic device determines whether the relative angle between the wearable device and the first electronic device is in the set angle range. In response to the relative angle being in the set angle range, the first electronic device is identified as the electronic device currently being used by a user. In response to the relative angle being outside the set angle range while the relative angle between second electronic device and the wearable device is in the set angle range, the second electronic device is identified as the electronic device currently being used by the user. The above steps accomplish the identification of the electronic device currently being used by the user, transmitting the obtained first information to the target electronic device, simplifying the operation process, and improving the user experience.

It can be understood that the first electronic device executes S301-S306 repeatedly in some embodiments. By repeatedly executing S301-S306, the first electronic device tracks the target electronic device currently being used by the user. For example, by repeatedly executing S301-S306, in response to the relative angle between the first electronic device and the wearable device being in the set angle range in every execution, the first electronic device is identified as the target electronic device during the time of repeatedly executing S301-S306.

Figure 5:
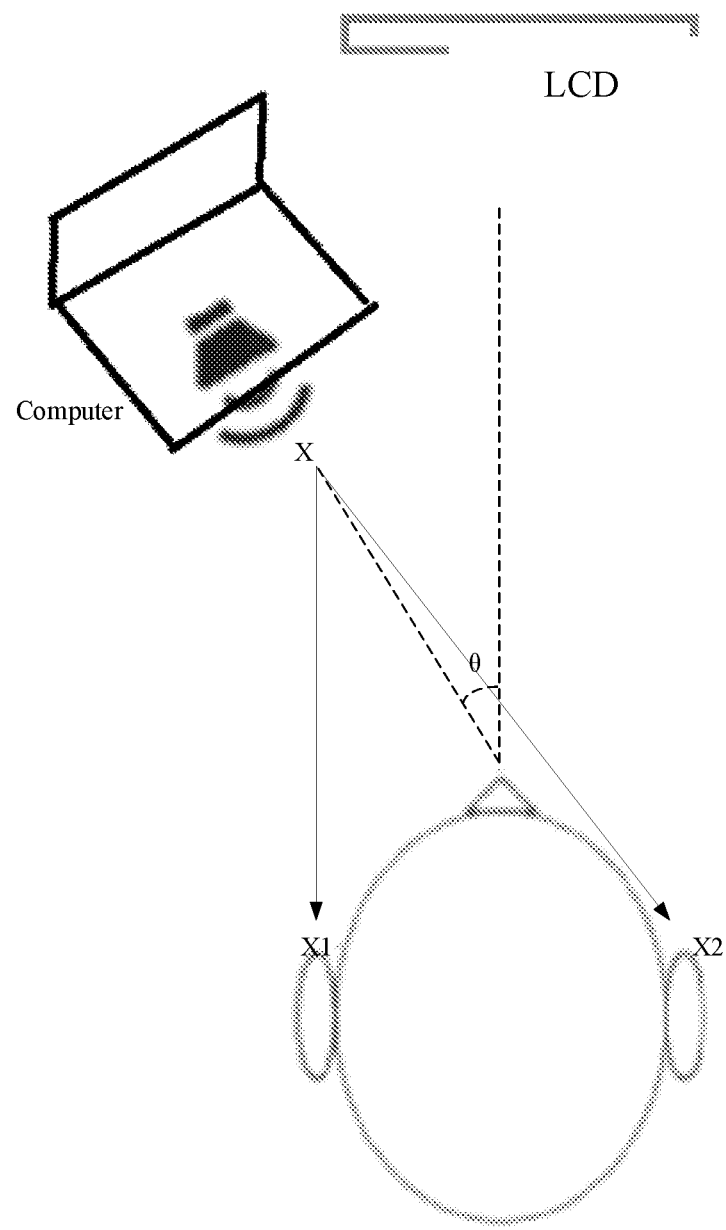
FIG. 5 depicts a schematic diagram of an exemplary scenario of applying a control method according to various embodiments of the present disclosure.

Alternatively, by repeatedly executing S301-S306, the relative angle between the first electronic device and the wearable device is firstly confirmed in the set angle range, which leads to the identification of the first electronic device as the target electronic device. After the first electronic device is identified as the target electronic device, as shown in FIG. 5, a wearable device (e.g., a headset) is deflected by θ degree with respect to a first electronic device (e.g., a computer). A relative deflection angle between the wearable device and the first electronic device changes. The relative angle between the first electronic device and the wearable device changes as well, shifting from in the set angle range to outside the set angle range. Meanwhile, the relative angle between a second electronic device (such as a liquid crystal display) and the wearable device is determined in the set angle range, which leads to the identification of the second electronic device as the target electronic device.

Alternatively, by repeatedly executing S301-S306, the relative angle between the first electronic device and the wearable device is determined to be outside the set angle range in every execution. Meanwhile, the relative angle between the second electronic device and the wearable device is in the set angle range in every execution. The second electronic device is identified as the target electronic device during the time of repeatedly executing S301-S306.

Figure 6:
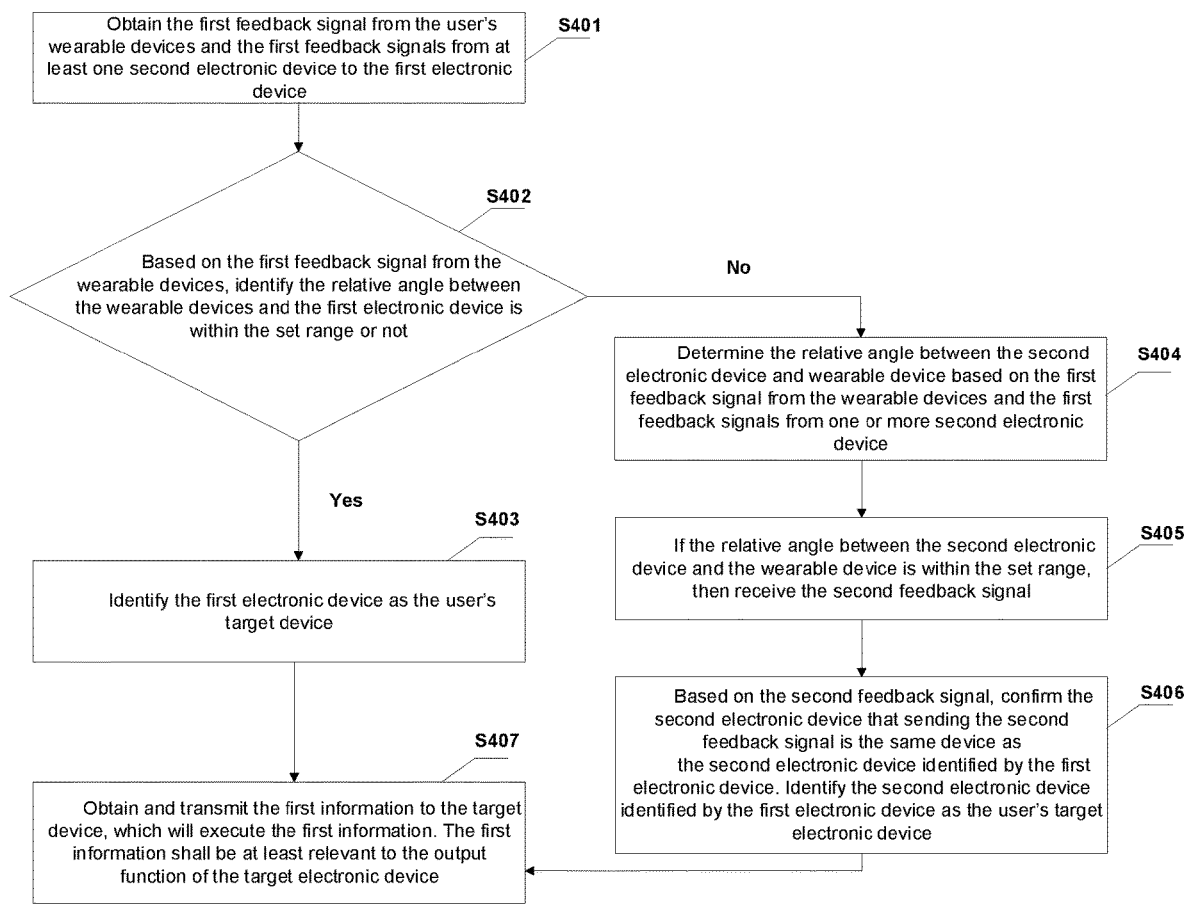
FIG. 6 depicts a schematic flowchart of another exemplary control method according to various embodiments of the present disclosure.

FIG. 6 depicts a schematic flowchart of another exemplary control method according to various embodiments of the present disclosure. For example, FIG. 6 provides more information, compared with embodiment illustrated in FIG. 4. The control method in FIG. 6 includes but is not limited to the following steps:

S401: obtaining a first feedback signal from a wearable device of a user in response to the first electronic device, and a first feedback signal from at least one second electronic device in response to the first electronic device.

S402: based on the first feedback signal of the wearable device, determining whether the relative angle between the wearable device and the first electronic device is in the set angle range.

In response to the relative angle being in the set angle range, the method proceeds to S403; Otherwise, the method proceeds to S404.

S403: identifying the first electronic device as the target electronic device.

S404: determining the relative angle between the second electronic device and the wearable device based on the first feedback signal of the wearable device and the first feedback signal of the at least one second electronic device.

In various embodiments, S401-S404 may be processed in a same or similar manner as illustrated in S301-S304 of FIG. 4.

S405: in response to the relative angle between the second electronic device and the wearable device being in the set angle range, obtaining a second feedback signal.

The second feedback signal is transmitted by one of the at least one second electronic device under the condition that the relative angle between that one of the at least one second electronic device and the wearable device is in the set angle range.

In one embodiment, relative angles between each of the at least one second electronic device and the wearable device are determined. When the relative angles are in the set angle range, the corresponding each one of the at least one second electronic device transmits second feedback signal to the first electronic device.

S406: based on the second feedback signal, confirming that a second electronic device that transmits the second feedback signal is the same second electronic device identified by the first electronic device. The second electronic device identified by the first electronic device is identified as the target electronic device.

It can be understood that the second electronic device identified by the first electronic device is the second electronic device whose relative angle with respect to the wearable device is in the set angle range.

In one embodiment, second feedback signals transmitted by different second electronic devices are different from each other. Thus, a second feedback signal transmitted by a second electronic device is able to uniquely represent the corresponding second electronic device. Based on the second feedback signal, identify information of the second electronic device associated with the second feedback signal is confirmed. The identity information of the second electronic device associated with the second feedback signal is compared to an identity information of the second electronic device confirmed by the first electronic device. In response to the identity information being identical, the second electronic device transmitting second feedback signal is the same second electronic device identified by the first electronic device.

S405-S406 are exemplary processes of processing of S305 in FIG. 4.

S407: obtaining and transmitting the first information to the target electronic device which executes the first information. The first information is at least relevant to the output function of the target electronic device In one embodiment, in response to the relative angle between the wearable device and the first electronic device being outside the set angle range, the determination of the relative angle between the second electronic device and the wearable device is based on the first feedback signal of the wearable device and the first feedback signals of the at least one second electronic device. In response to the relative angle between the wearable device and the second electronic device being in the set angle range, by obtaining and analyzing the second feedback signal, the second electronic device that transmitting the second feedback signal is identified as the same second electronic device that is identified by the first electronic device. The second electronic device that is identified by the first electronic device is recognized as the target electronic device. The method disclosed herein simplifies the operation process, improves user experience, and enhances identifying accuracy of the target electronic device.

Figure 7:
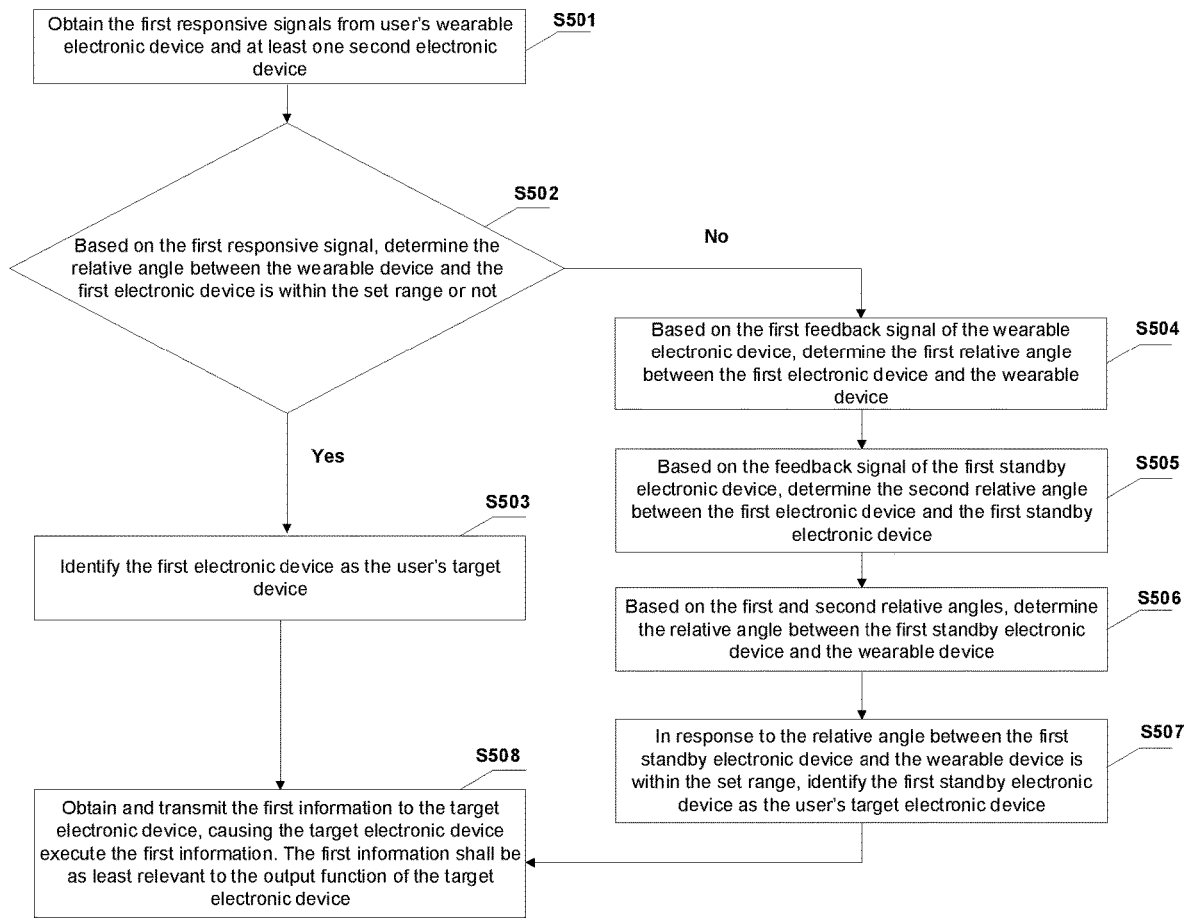
FIG. 7 depicts a schematic flowchart of another exemplary control method according to various embodiments of the present disclosure.

FIG. 7 depicts a schematic flowchart of another exemplary control method according to various embodiments of the present disclosure. For example, FIG. 7 provides more information, compared with embodiment illustrated in FIG. 4. The control method in FIG. 7 includes but is not limited to the following steps:

S501: obtaining a first feedback signal from a wearable device of a user in response to the first electronic device, and a first feedback signal from at least one second electronic device in response to the first electronic device.

S502: based on the first feedback signal of the wearable device, determining whether the relative angle between the wearable device and the first electronic device is in a set angle range.

The method proceeds to S503 when the relative angle is in the set angle range. Otherwise, the method proceeds to S504.

S503: identifying the first electronic device as the target electronic device.

In various embodiments, S501-S503 may be processed in a same or similar manner as illustrated in S301-S303 of FIG. 4.

S504: determining the first relative angle between the first electronic device and the wearable device based on the first feedback signal of the wearable device.

In various embodiments, S504 may be processed in a same or similar manner as illustrated in S2021-S2022 of FIG. 2.

S505: determining a second relative angle between the first electronic device and a first standby electronic device based on a feedback signal of the first standby electronic device.

Within the coverage of the signal transmitted by the first electronic device, there is one of the at least one second electronic devices, which is the first standby electronic device.

Determining the second relative angle between the first electronic device and the first standby electronic device based on the feedback signal of the first standby electronic device, includes:

S5051: determining a relative distance between the first standby electronic device and the first electronic device based on a first feedback signal of the first standby electronic device.

In some embodiments, determining the relative distance between the first standby electronic device and the first electronic device based on the first feedback signal of the first standby electronic device includes calculating a transmission time of a signal transmitted by the first electronic device between the first electronic device and the first standby electronic device based on the first feedback signal of the first standby electronic device. A product of the transmission time and a propagation speed of the signal transmitted by the first electronic device is the relative distance between the first standby electronic device and the first electronic device.

S5052: based on the relative distance between the first standby electronic device and the first electronic device, determining the relative angle between the first standby electronic device and the first electronic device.

S506: determining a relative angle between the first standby electronic device and the wearable device based on the first relative angle and the second relative angle.

Based on the first relative angle and the second relative angle, determining the relative angle between the first standby electronic device and the wearable device includes but is not limited to:

S5061: based on the first relative angle and the relative distance between the first electronic device and the wearable device, determining the relative position of the wearable device with respect to the first electronic device.

S5062: determining a relative position of the first standby electronic device with respect to the first electronic device based on the second relative angle and the relative distance between the first standby electronic device and the first electronic device.

S5063: determining the relative angle between the first standby electronic device and the wearable device based on the relative position of the wearable device with respect to the first electronic device and the relative position of the first standby electronic device with respect to the first electronic device.

S504-S506 are exemplary processes of processing S304 in FIG. 4.

S507: in response to the relative angle between the first standby electronic device and the wearable device being in the set angle range, identifying the first standby electronic device as the target electronic device.

S507 is an exemplary process of processing of S305 in FIG. 4.

S508: obtaining and transmitting first information to the target electronic device for the target electronic device to execute the first information. The first information shall be at least relevant to the output function of the target electronic device.

In one embodiment, the first electronic device determines the second relative angle between the first electronic device and the first standby electronic device within the coverage of the signal transmitted by the first electronic device. Based on the first relative angle between the first electronic device and wearable device, the relative angle between the first standby electronic device and the wearable device can be determined. When the relative angle between the first standby electronic device and the wearable device is within the set angle range, the first standby electronic device is identified as the target electronic device. This process realizes the confirmation of the target electronic device and transmits the obtained first information to the target electronic device. This process simplifies the operation process and improves the user experience.

Figure 8:
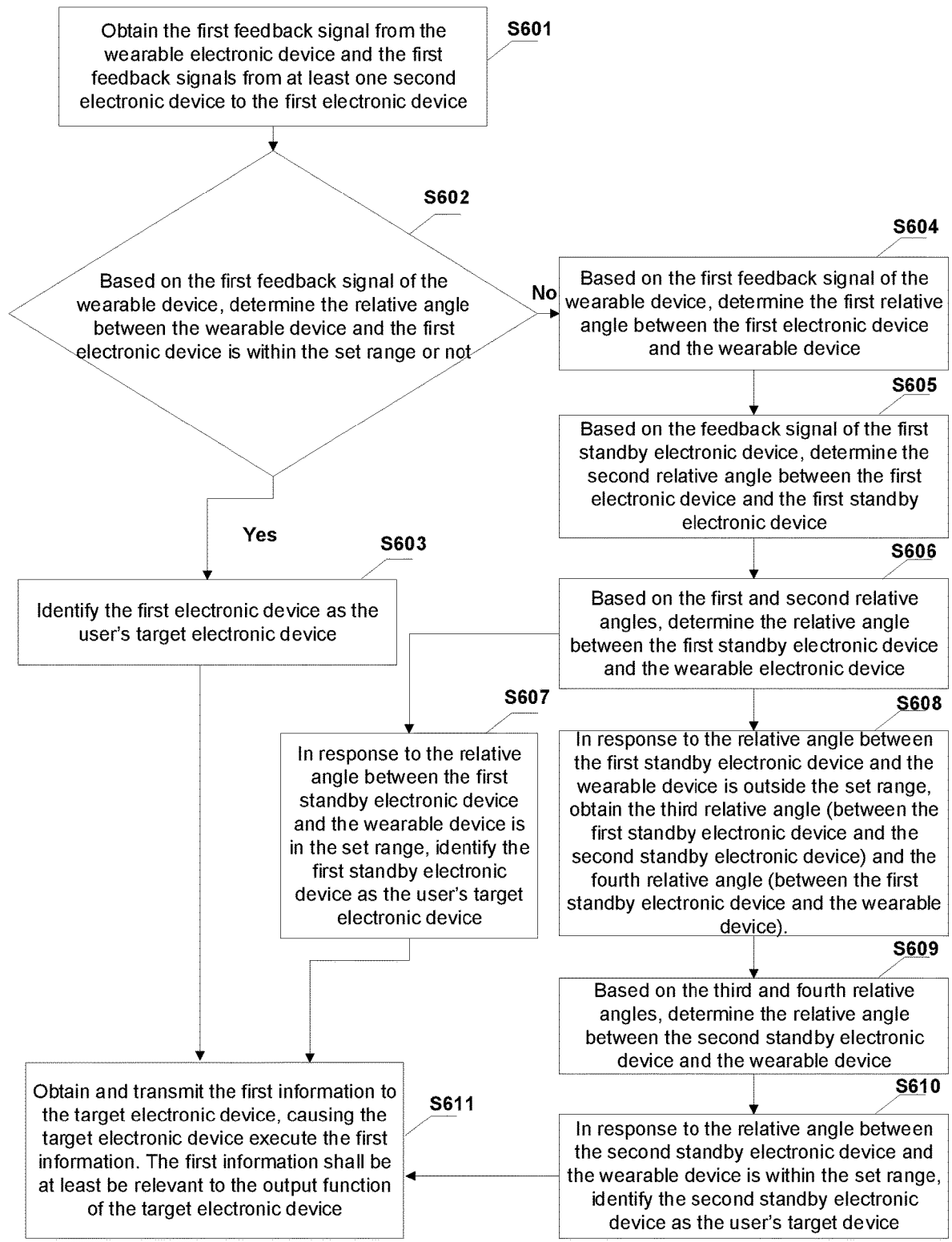
FIG. 8 depicts a schematic flowchart of another exemplary control method according to various embodiments of the present disclosure.

FIG. 8 depicts a schematic flowchart of another exemplary control method according to various embodiments of the present disclosure. For example, FIG. 8 further extends the embodiment illustrated in FIG. 7. As shown in FIG. 8, the method includes but is not limited to the following steps:

S601: obtaining a first feedback signal from a wearable device of a user in response to the first electronic device, and a first feedback signal from at least one second electronic device in response to the first electronic device.

S602: based on the first feedback signal of the wearable device, determining whether the relative angle between the wearable device and the first electronic device is in the set angle range.

The method proceeds to S603 when the relative angle is in the set angle range. Otherwise, the method proceeds to S604.

S603: identifying the first electronic device as the target electronic device.

S604: determining a first relative angle between the first electronic device and the wearable device based on the first feedback signal of the wearable device.

S605: determining a second relative angle between the first electronic device and the first standby electronic device based on the feedback signal of a first standby electronic device. The first standby electronic device is at least one second electronic device which is within the coverage of the signals transmitted by the first electronic device.

S606: determining a relative angle between the first standby electronic device and the wearable device based on the first relative angle and the second relative angle.

S607: in response to the relative angle between the first standby electronic device and the wearable device being in the set angle range, identifying the first standby electronic device as the target electronic device.

In various embodiments, S601-S607 may be processed in a same or similar manner as illustrated in S501-S507 of FIG. 7.

S608: in response to the relative angle between the first standby electronic device and the wearable device being outside the set angle range, obtaining the third relative angle between the first standby electronic device and the second standby electronic device, which is fed back from the first standby electronic device, and the fourth relative angle between the first standby electronic device and the wearable device, which is fed back from the first standby electronic device.

The second standby electronic device is one of the at least second electronic device that is out of coverage of the signal transmitted by the first electronic device.

It can be understood that under the circumstance that the coverage area of the signal transmitted by the first electronic device is limited, some second electronic devices do not receive the signal transmitted by the first electronic device, corresponding to the scenario that some second electronic devices do not receive the signal transmitted by the first electronic device. The first standby electronic device becomes the relay equipment, transmitting signals. Based on a third feedback signal of the second standby electronic device in response to the first standby electronic device, a third relative angle between the first standby electronic device and the second standby electronic device is determined. Then, the third relative angle will be fed back to the first electronic device. Accordingly, the first electronic device obtains the third relative angle.

In some embodiments, the first standby electronic device determines the fourth relative angle between the first standby electronic device and the wearable device based on the third feedback signal of the wearable device in response to the first standby electronic device. Then, the first standby electronic device transmits the fourth relative angle to the first electronic device. Accordingly, the first electronic device obtains the fourth relative angle.

S609: determining the relative angle between the second standby electronic device and the wearable device based on the third relative angle and the fourth relative angle.

In one embodiment, the detailed process of determining the relative angle between the second standby electronic device and the wearable device based on the third relative angle and the fourth relative angle can be referred to the relevant descriptions of S506 in FIG. 7.

S610: in response to the relative angle between the second standby electronic device and the wearable device being in the set angle range, identifying the second standby electronic device as the target electronic device.

S611: obtaining and transmitting the first information to the target electronic device, for the target electronic device to execute the first information. The first information is at least relevant to the output function of the target electronic device.

In one embodiment, under the circumstance that the coverage area of the signal transmitted by the first electronic device is limited, some second electronic devices do not receive the signals transmitted by the first electronic device, and the first electronic device cannot determine the relative angles between some second electronic devices and the first electronic device, which causes a difficulty to determine the relative angles between some second electronic devices and the wearable device. To address that, the first electronic device determines the relative angle between the second standby electronic device and the wearable device based on the third relative angle and the fourth relative angle. The first standby electronic device is the second electronic device within the coverage of the signal transmitted by the first electronic device. The third relative angle is fed back by the first standby electronic device, representing the angle between it and the second standby electronic device. The fourth relative angle is the angle between the first standby electronic device and the wearable device. This method ensures that no second electronic device will be missed, accurately identifies the target electronic device, and transmits the obtained first information to the target electronic device. This method simplifies the operation process and improves the user experience.

Various embodiments also provide a control apparatus. For example, FIG. 9 depicts an exemplary control apparatus according to various embodiments of the present disclosure.

Figure 9:
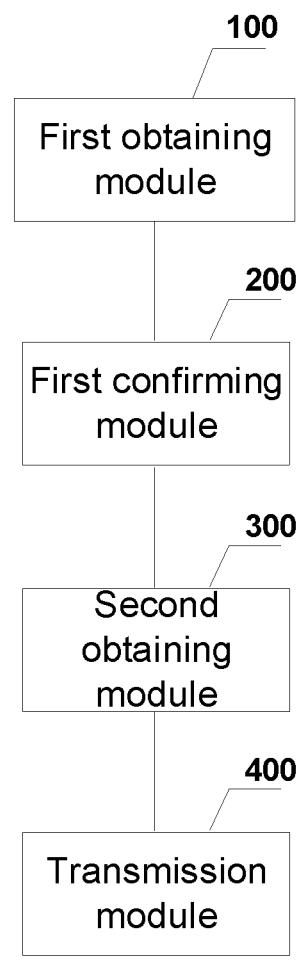
FIG. 9 depicts an exemplary control apparatus according to various embodiments of the present disclosure.

As shown in FIG. 9, the control apparatus includes a first obtaining module 100, a first determining module 200, a second obtaining module 300, and a transmission module 400.

The first obtaining module 100, configured to obtain a first feedback signal from a wearable device of a user in response to the first electronic device, and a first feedback signal from at least one second electronic device in response to the first electronic device.

The first determining module 200 is configured to identify the target electronic device of the user from the first electronic device and the at least one second electronic device, according to at least one first feedback signal based on the first feedback signal from the wearable device and the first feedback signal from the at least one second electronic device, wherein the relative angle between the wearable device and the target electronic device is in the set angle range.

The second obtaining module 300 is configured to obtain the first information, wherein the first information is at least relevant to the output function of the target electronic device.

The transmission module 400 is configured to transmit the first information to the target electronic device for the target electronic device to execute the first information.

In one embodiment, the first determining module 200 is configured for: based on the first feedback signal of the wearable device, determining whether the relative angle between the wearable device and the first electronic device is in the set angle range.

In response to the relative angle between the wearable device and the first electronic device being in the set angle range, it is determined that the first electronic device is the target electronic device.

In one embodiment, the first determining module 200 may be configured for: in response to the relative angle between the wearable device and the first electronic device being outside the set angle range, determining the relative angle between wearable device and the second electronic device based on the first feedback signal of the wearable device and the first feedback signal of at least one second electronic device.

In response to the relative angle between the second electronic device and the wearable device being in the set angle range, identifying the second electronic device as the target electronic device.

In one embodiment, the first determining module 200 can be configured for: obtaining a second feedback signal which is transmitted by one of the at least one second electronic device under the condition that a relative angle between the one of the at least one second electronic device and the wearable device is in the set angle range; based on the second feedback signal, confirming that the second electronic device transmitting the second feedback signal is the same second electronic device identified by the first electronic device; and identifying the second electronic device which is identified by the first electronic device as the target electronic device.

In one embodiment, the first determining module 200 may be configured for: determining the first relative angle between the first electronic device and the wearable device based on the first feedback signal of the wearable device.

The second relative angle between the first electronic device and the first standby electronic device is determined based on the feedback signal of the first standby electronic device. The first standby electronic device is one of the at least one second electronic device located within the coverage of the signal transmitted from the first electronic device.

Based on the first relative angle and the second relative angle, the relative angle between the first standby electronic device and the wearable device is determined.

The first determining module 200 mentioned above can also be configured for: obtaining the third relative angle, between the first standby electronic device and the second standby electronic device, and the fourth relative angle, between the first standby electronic device and the wearable device, both of which are fed back from the first standby electronic device. The second standby electronic device is one of the at least one second electronic device that is outside the coverage of the signal transmitted by the first electronic device.

Based on the third relative angle and the fourth relative angle, a relative angle between the second standby electronic device and the wearable device is determined.

In one embodiment, the second obtaining module 300 is configured to: in response to a first trigger event, obtaining display data displayed by the first electronic device. Correspondingly, the transmission module 400 can be configured to: transmitting the display data displayed by the first electronic device to the target electronic device.

Corresponding to the control method described in one embodiment, the present disclosure also provides an embodiment of applying the control method in an electronic device.

Figure 10:
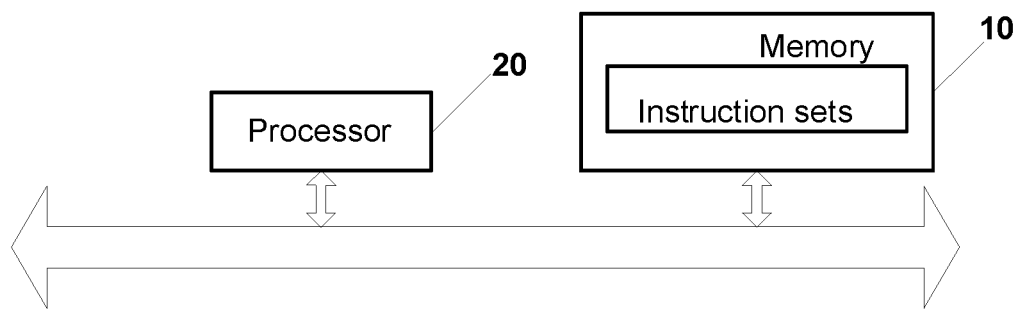
FIG. 10 schematically depicts an exemplary electronic device according to various embodiments of the present disclosure.

FIG. 10 schematically depicts an exemplary electronic device according to various embodiments of the present disclosure. The electronic device includes the following components: a memory 10 and a processor 20.

The memory 10 is configured for storing at least one set of instructions. The processor 20 is configured for calling and executing the at least one set of instructions in the memory 10. Through executing the at least one set of instructions, the processor 20 executes any of the control methods disclosed herein.

Corresponding to the embodiment of a control method provided above in this disclosure, the present disclosure further provides an embodiment of a non-transitory computer readable storage medium.

In one embodiment, the non-transitory computer readable storage medium stores computer programs for implementing the disclosed control methods. The programs are executed to implement the control methods disclosed in the present disclosure.

It should be noted that, each embodiment has its own focused area. The same or similar parts between the embodiments can be referred to each other. As for the embodiments of the apparatus, since they are similar to the embodiments of methods, the description is relatively simple. However, the embodiments of the apparatus can be referred to the descriptions of relevant parts in the embodiments of methods.

Finally, it should also be noted that in this disclosure, relational terms such as "first" and "second" are used only to distinguish one entity or operation from another entity or operation. Those terms do not necessarily require or imply these entities have any such relationships or sequences between the entities and operations. Moreover, terms like "including", "comprising" or any other variants thereof are intended to encompass a non-exclusive inclusion such that a process, method, article, or device that includes a list of elements not only includes those elements, but also includes elements not explicitly listed. Other elements inherent to such a process, method, article or apparatus are also included. Without further limitation, an element described by the phrase "comprising a . . . " does not preclude the presence of additional identical elements in a process, method, article or apparatus that includes the element.

For the convenience of description, when describing the above apparatus, the functions are divided into various modules and described individually. Of course, when implementing the present disclosure, the function of each module is implemented in one or more software and/or hardware.

From the description of the embodiments above, persons of ordinary skill in the art can clearly understand that the present invention can be implemented by means of software plus necessary general hardware platforms. Based on this understanding, the technical solutions of the present disclosure or the parts make contributions to the prior art can be embodied in the form of software products. The software products can be stored in non-transitory computer readable storage medium, such as ROM/RAM, magnetic disks, CD, etc. The software products include several instructions to order computer devices (which can be a personal computer, a server, or a network device, etc.) to execute the methods described in various embodiments or some parts of the embodiments of the present disclosure.

The above description depicts a control method, apparatus, electronic device, and non-transitory computer readable storage medium. The principles and implementations of the present inventions are described with specific examples in this disclosure. The descriptions of the above embodiments are only used to facilitate the understanding of the methods and the core ideas of the present disclosure. At the same time, for those persons of ordinary skill in the art, with the ideas of the present application, changes may be applied during the implementations and the application scope. In summary, the content of this specification shall not be interpreted as a limitation of this application.

What is claimed is:

1. A control method applied to first electronic device comprising:

obtaining a first feedback signal from a wearable device of a user in response to a signal sent from the first electronic device, and a first feedback signal from at least one second electronic device in response to the signal sent from the first electronic device, the signal sent by the first electronic device being an ultrasound signal or an electromagnetic signal;

identifying a target electronic device of the user from the first electronic device and the at least one second electronic device, according to at least one first feedback signal based on the first feedback signal from the wearable device and the first feedback signal from the at least one second electronic device;

wherein a relative angle between the target electronic device and the wearable device is within a set angle range;

obtaining first information and transmitting the first information to the target electronic device for the target electronic device to execute the first information;

wherein the first information is at least relevant to an output function of the target electronic device.

2. The method of claim 1, wherein identifying the target electronic device of the user from the first electronic devices and the at least one second electronic device, according to at least one first feedback signal based on the first feedback signal from the wearable device and the first feedback signal from the at least one second electronic device, comprises:

determining whether a relative angle between the wearable device and the first electronic device falls in the set angle range, based on the first feedback signal of the wearable device; and in response to the relative angle between the wearable device and the first electronic device being in the set angle range, identifying the first electronic device as the target electronic device of the user.

3. The method of claim 2 further comprising:

in response to the relative angle between the wearable device and the first electronic device falling outside the set angle range, determining a relative angle between a second electronic device and the wearable device based on the first feedback signal of the wearable device and the first feedback signal of the at least one second electronic device; and in response to the relative angle between the second electronic device and the wearable device being in the set angle range, identifying the second electronic device as the target electronic device of the user.

4. The method of claim 3, identifying the second electronic device as the target electronic device of the user, comprising:

obtaining a second feedback signal, wherein the second feedback signal is transmitted under a circumstance that a relative angle between one second electronic device of the at least one second electronic device and the wearable device is in the set angle range;

confirming the one second electronic device that transmitting the second feedback signal is a same device as the second electronic device identified by the first electronic device; and identifying the second electronic device determined by the first electronic device as the target electronic device of the user.

5. The method of claim 3, determining the relative angle between the second electronic device and the wearable device based on the first feedback signal of the wearable device and the first feedback signal of the at least one second electronic device, comprising:

determining a first relative angle between the first electronic device and the wearable deice based on the first feedback signal of the wearable device;

determining a second relative angle between the first electronic device and a first standby electronic device based on a feedback signal from the first standby electronic device;

wherein the first standby electronic device is one of the at least one second electronic device that is within a coverage of signals transmitted by the first electronic device; and determining a relative angle between the first standby electronic device and the wearable device based on the first and second relative angles.

6. The method of claim 5 further comprising:

obtaining a third relative angle between the first standby electronic device and a second standby electronic device, from the first standby electronic device, and a fourth relative angle between the first standby electronic device and the wearable device, from the first standby electronic device;

wherein the second standby electronic device is one of the at least one second electronic device that is within the coverage of the signals transmitted by the first electronic device; and determining a relative angle between the second standby electronic device and the wearable device based on the third and fourth relative angles.

7. The method of claim 1, obtaining the first information and transmitting the first information to the target electronic device, comprising:

in response to a first trigger event, obtaining display data displayed by the first electronic device and transmitting the display data to the target electronic device.

8. An electronic device, comprising:

a memory, configured to store at least one set of instructions; and a processor, configured to call and execute the at least one set of instructions in the memory, and to perform a control method, the method comprising:

obtaining a first feedback signal from a wearable device of a user in response to a signal sent from the first electronic device, and a first feedback signal from at least one second electronic device in response to the signal sent from the first electronic device, the signal sent by the first electronic device being an ultrasound signal or an electromagnetic signal; and identifying a target electronic device of the user from the first electronic device and the at least one second electronic device, according to at least one first feedback signal based on the first feedback signal from the wearable device and the first feedback signal from the at least one second electronic device; wherein a relative angle between the target electronic device and the wearable device is within a set angle range; and obtaining first information and transmitting the first information to the target electronic device for the target electronic devices to execute the first information;

wherein the first information is at least relevant to an output function of the target electronic device.

9. The electronic device of claim 8, wherein identifying the target electronic device of the user from the first electronic devices and the at least one second electronic device, according to at least one first feedback signal based on the first feedback signal from the wearable device and the first feedback signal from the at least one second electronic device comprises:

determining whether the relative angle between the wearable device and the first electronic device falls in the set angle range, based on the first feedback signal of the wearable device; and in response to the relative angle between the wearable device and the first electronic device being in the set angle range, identifying the first electronic device as the target electronic device of the user.

10. The electronic device of claim 9, wherein the method further comprises:

in response to the relative angle between the wearable device and the first electronic device falling outside the set angle range, determining a relative angle between a second electronic device and the wearable device based on the first feedback signal of the wearable device and the first feedback signal of the at least one second electronic device; and in response to the relative angle between the second electronic device and the wearable device being in the set angle range, identifying the second electronic device as the target electronic device of the user.

11. The electronic device of claim 10, wherein identifying the second electronic device as the target electronic device of the user comprises:

obtaining a second feedback signal, wherein the second feedback signal is transmitted under a circumstance that a relative angle between one second electronic device of the at least one second electronic device and the wearable device is in the set angle range;

confirming the one second electronic device that transmitting the second feedback signal is a same device as the second electronic device identified by the first electronic device; and identifying the second electronic device determined by the first electronic device as the target electronic device of the user.

12. The electronic device of claim 10, wherein determining the relative angle between the second electronic device and the wearable device based on the first feedback signal of the wearable device and the first feedback signal of the at least one second electronic device, comprises:
- determining a first relative angle between the first electronic device and the wearable deice based on the first feedback signal of the wearable device;
- determining a second relative angle between the first electronic device and a first standby electronic device based on a feedback signal from the first standby electronic device;
  - wherein the first standby electronic device is one of the at least one second electronic device that is within a coverage of signals transmitted by the first electronic device; and
- determining a relative angle between the first standby electronic device and the wearable device based on the first and second relative angles.

13. The electronic device of claim 12, wherein the method further comprises:
- obtaining a third relative angle between the first standby electronic device and a second standby electronic device, from the first standby electronic device, and a fourth relative angle between the first standby electronic device and the wearable device, from the first standby electronic device;
- wherein the second standby electronic device is one of the at least one second electronic device that is within the coverage of the signals transmitted by the first electronic device; and
- determining a relative angle between the second standby electronic device and the wearable device based on the third and fourth relative angles.

14. The electronic device of claim 8, wherein obtaining the first information and transmitting the first information to the target electronic device, comprises:
- in response to a first trigger event, obtaining display data displayed by the first electronic device and transmitting the display data to the target electronic device.

15. A non-transitory computer readable storage medium, configured to store a computer program, wherein the computer program, when being executed, cause a processor to implement a control method, the method comprising:
- obtaining a first feedback signal from a wearable device of a user in response to a signal sent from the first electronic device, and a first feedback signal from at least one second electronic device in response to the signal sent from the first electronic device, the signal sent by the first electronic device being an ultrasound signal or an electromagnetic signal; and
- identifying a target electronic device of the user from the first electronic device and the at least one second electronic device, according to at least one first feedback signal based on the first feedback signal from the wearable device and the first feedback signal from the at least one second electronic device;
  - wherein a relative angle between the target electronic device and the wearable device is within a set angle range; and
- obtaining first information and transmitting the first information to the target electronic device for the target electronic devices to execute the first information;
  - wherein the first information is at least relevant to an output function of the target electronic device.

16. The non-transitory computer readable storage medium of claim 15, wherein identifying the target electronic device of the user from the first electronic devices and the at least one second electronic device, according to at least one first feedback signal based on the first feedback signal from the wearable device and the first feedback signal from the at least one second electronic device comprises:
- determining whether the relative angle between the wearable device and the first electronic device falls in the set angle range, based on the first feedback signal of the wearable device; and
- in response to the relative angle between the wearable device and the first electronic device being in the set angle range, identifying the first electronic device as the target electronic device of the user.

17. The non-transitory computer readable storage medium of claim 16, wherein the method further comprises:
- in response to the relative angle between the wearable device and the first electronic device falling outside the set angle range, determining a relative angle between a second electronic device and the wearable device based on the first feedback signal of the wearable device and the first feedback signal of the at least one second electronic device; and
- in response to the relative angle between the second electronic device and the wearable device being in the set angle range, identifying the second electronic device as the target electronic device of the user.

18. The non-transitory computer readable storage medium of claim 17, wherein identifying the second electronic device as the target electronic device of the user comprises:
- obtaining a second feedback signal, wherein the second feedback signal is transmitted under a circumstance that a relative angle between one second electronic device of the at least one second electronic device and the wearable device is in the set angle range;
- confirming the one second electronic device that transmitting the second feedback signal is a same device as the second electronic device identified by the first electronic device; and
- identifying the second electronic device determined by the first electronic device as the target electronic device of the user.

19. The non-transitory computer readable storage medium of claim 17, wherein determining the relative angle between the second electronic device and the wearable device based on the first feedback signal of the wearable device and the first feedback signal of the at least one second electronic device, comprises:
- determining a first relative angle between the first electronic device and the wearable deice based on the first feedback signal of the wearable device;
- determining a second relative angle between the first electronic device and a first standby electronic device based on a feedback signal from the first standby electronic device;
  - wherein the first standby electronic device is one of the at least one second electronic device that is within a coverage of signals transmitted by the first electronic device; and
- determining a relative angle between the first standby electronic device and the wearable device based on the first and second relative angles.

20. The non-transitory computer readable storage medium of claim 19, wherein the method further comprises:
- obtaining a third relative angle between the first standby electronic device and a second standby electronic device, from the first standby electronic device, and a fourth relative angle between the first standby electronic device and the wearable device, from the first standby electronic device;

wherein the second standby electronic device is one of the at least one second electronic device that is within the coverage of the signals transmitted by the first electronic device; and determining a relative angle between the second standby electronic device and the wearable device based on the third and fourth relative angles.

\* \* \* \* \*